Sept. 25, 1962  A. J. BUCHI  3,055,350
VALVE CONTROL GEAR FOR INTERNAL COMBUSTION ENGINES
HAVING CONCENTRIC INLET AND OUTLET VALVES
Filed Dec. 30, 1960  4 Sheets-Sheet 1
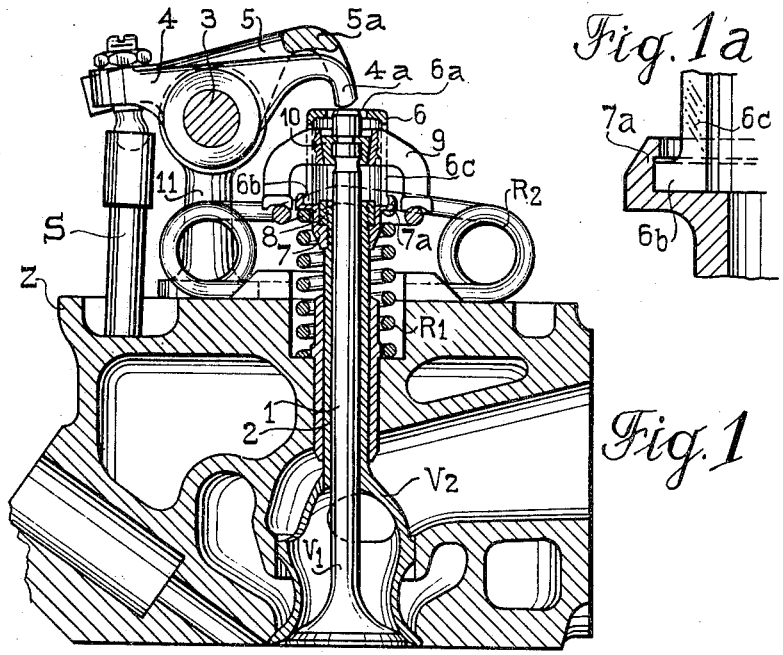
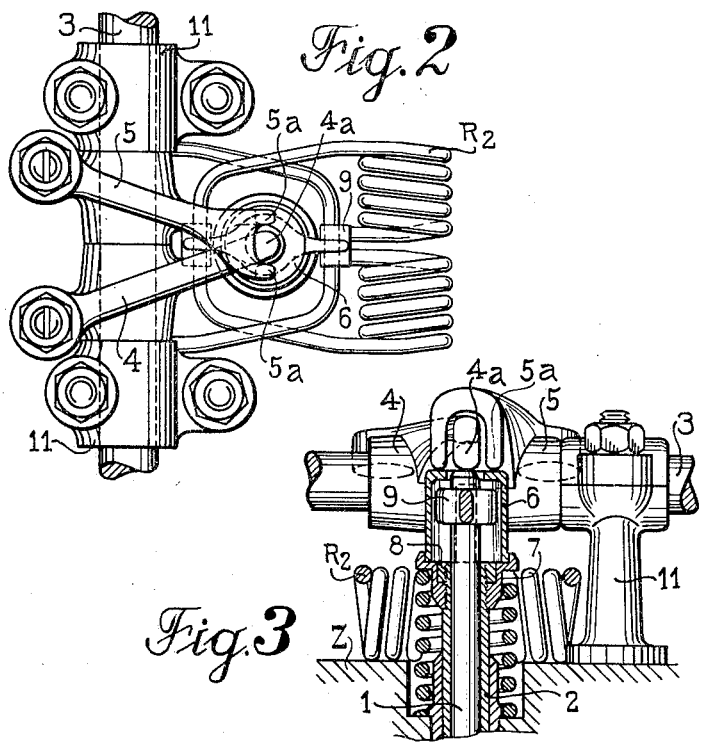

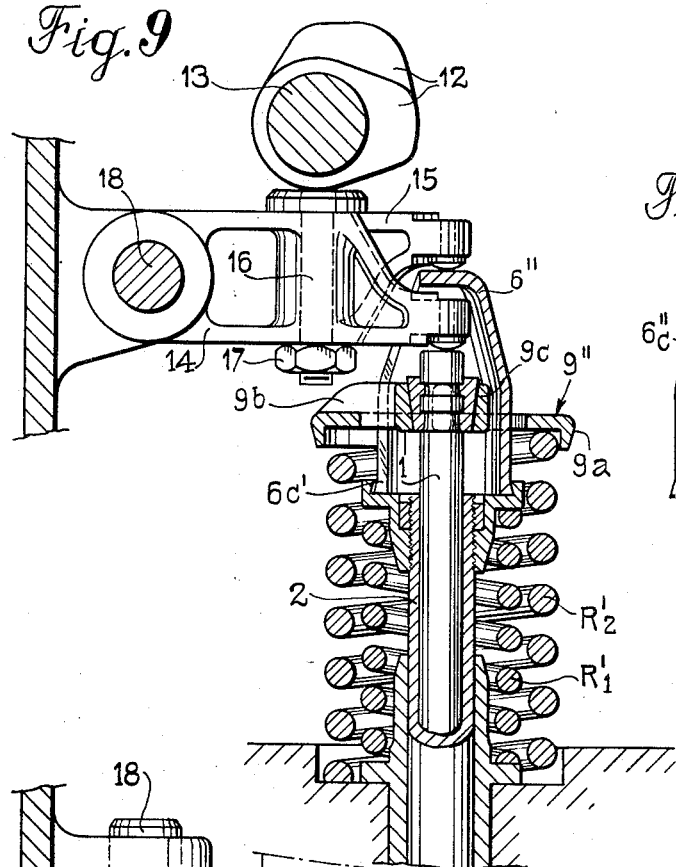
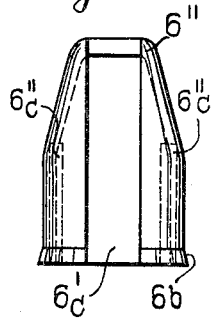
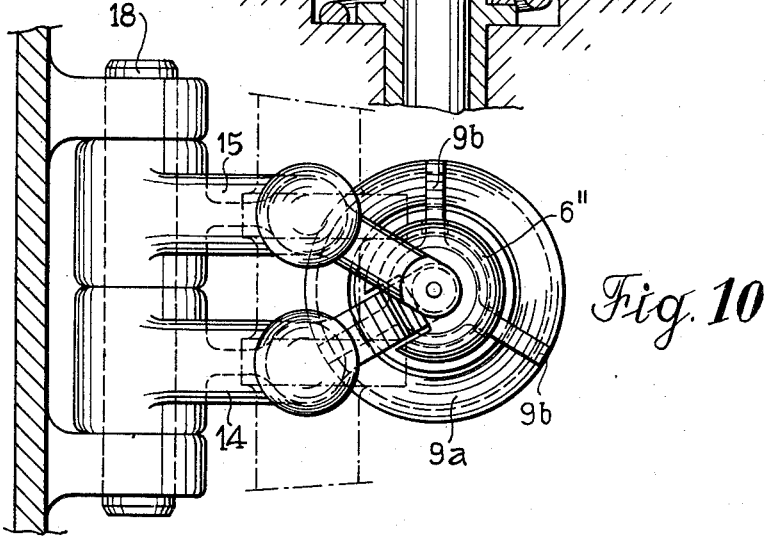

United States Patent Office 3,055,350
Patented Sept. 25, 1962

3,055,350
VALVE CONTROL GEAR FOR INTERNAL COMBUSTION ENGINES HAVING CONCENTRIC INLET AND OUTLET VALVES
Alfred Johann Buchi, Archstrasse 2, Winterthur, Switzerland
Filed Dec. 30, 1960, Ser. No. 79,727
Claims priority, application Switzerland Mar. 3, 1960
11 Claims. (Cl. 123—79)

The present invention relates to valve control gear for an internal combustion engine having inlet and outlet valves arranged concentrically in the cylinder head, for the control gear comprising at least one common lever shaft being provided for one or more cylinders, the lever shaft carrying at least a pair of levers each for operating one of a pair of concentric valves. The invention is characterised in that with reference to the axial transverse plane of the cylinder head at least a part of one lever of each pair lies in an axial plane inclined to its lever shaft, the inner valve of each pair of valves being actuated directly by its lever, and the outer valve of the pair being actuated by its lever through at least one intermediate piece.

According to a feature of the present invention, the action part of the lever for the outer valve may overlap or laterally encircle the action part of the lever for the inner valve.

According to a further feature of the present invention the levers may be constructed each with an action place which is central relatively to the valves, the action places being provided one above the other. This feature may be applied either with push rod operated levers or cam-controlled follower levers. In the preferred constructions, an intermediate piece for actuating the outer valve is so constructed that the valve can rotate freely relatively to the intermediate piece. Preferably also the intermediate piece or pieces through which the outer valve is actuated are connected to the valve in such a manner that they participate positively in the opening and closing movements thereof.

Figure 3A:
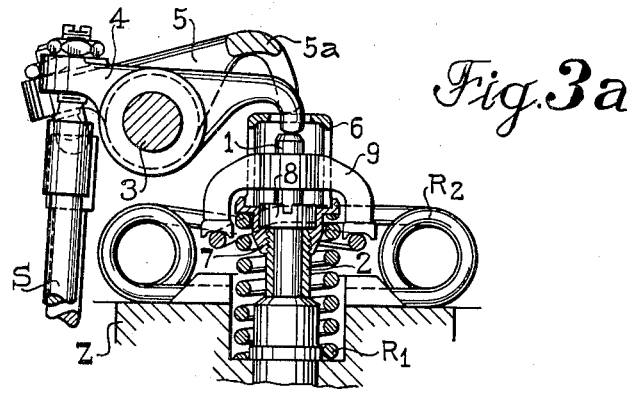
Figure 4:
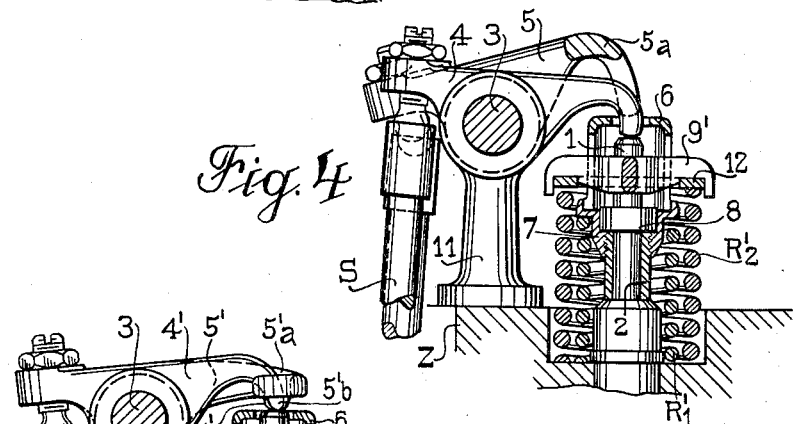
Figure 5:
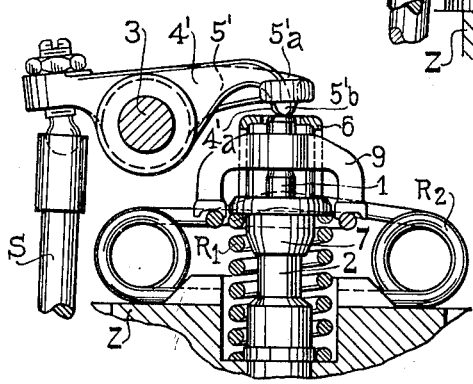
Figure 6:
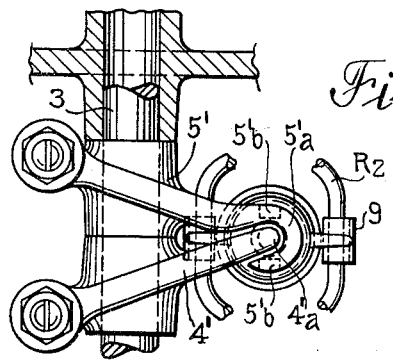
Figure 7:
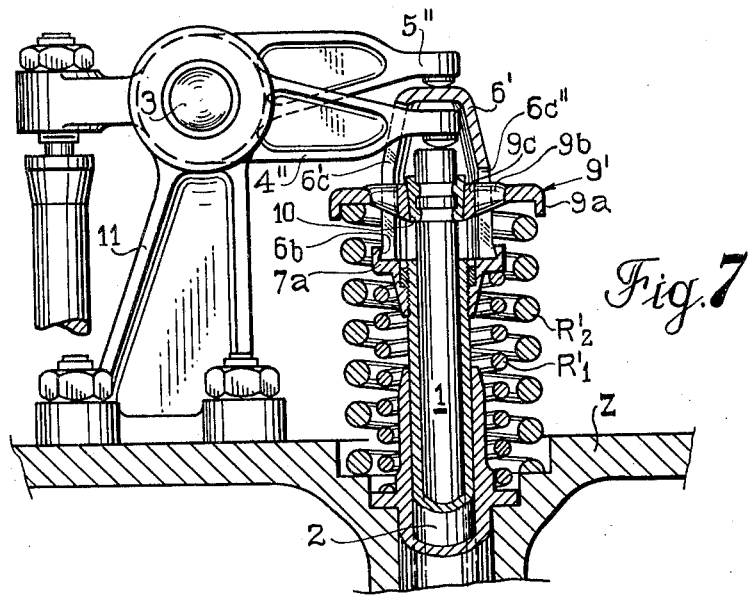
Figure 8:
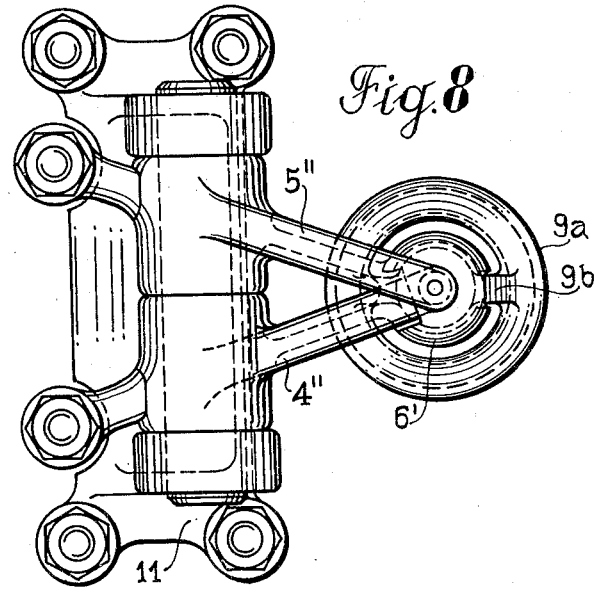

Specific embodiments of the present invention will now be described, merely by way of example with reference to the accompanying drawings in which:

FIGS. 1, 1a to 3 and 3a show a control gear according to the invention, the gear comprising rocking levers actuated by push rods, FIG. 1 showing the gear in axial longitudinal section through the cylinder head with hairpin springs for returning the inner valve and a helical spring for returning the outer valve, the valves being shown in the closed position, FIG. 1a showing a detail on a larger scale, FIG. 2 being a plan view of the gear as shown in FIG. 1, FIG. 3 being a front view of the rocking levers and including an axial longitudinal section through the parts of the gear co-operating with the rocking levers and FIG. 3a showing a part of the section according to FIG. 1 in the position in which the inner valve is open, FIG. 4 shows a modification of the gear shown in FIGS. 1, 1a to 3 and 3a, FIG. 4 corresponding to FIG. 1 and being an axial cross section through the cylinder head, only the top part of the cylinder head and valves being shown, FIGS. 5 and 6 show a further control gear according to the invention, FIG. 5 corresponding to FIG. 1, and FIG. 6 being a plan view of FIG. 5, FIGS. 7 and 8 show a still further control gear according to the invention, FIG. 7 showing the gear partly in elevation and partly in longitudinal section, and FIG. 8 being a plan view of FIG. 7, FIGS. 9, 9a and 10 show a still further control gear according to the invention, FIG. 9 showing the gear partly in elevation and partly in longitudinal section, FIG. 10 being a plan view of FIG. 9 and FIG. 9a showing a detail of construction.

In the drawings, Z is the cylinder head. The outer valve $V_2$ is guided in the cylinder head, and $V_1$ is the inner valve concentric with and moving in the outer valve. The valves are opened by means of a camshaft (not shown) and push rods S pressing on rocking levers, and are closed again at a suitable time by valve springs, $R_2$ for the inner valve and $R_1$ for the outer valve. FIG. 1 shows the inner valve $V_1$ and the outer valve $V_2$ in the closed condition. Each of the two valves has its control members operable independently of the other valve.

In FIGS. 1 to 3 and 3a, 1 is the stem for the inner valve and 2 is the hollow stem for the outer valve of the concentric valves $V_1$ and $V_2$. For one or more cylinders, a common rocking lever shaft 3 is provided for the rocking levers. The rocking lever for the inner valve is denoted by the reference numeral 4 and the rocking lever for the outer valve by the reference numeral 5. The lines of action of both rocking levers, with reference to the common axis of the valves $V_1$ and $V_2$, lie in axial planes which are inclined to the axial transverse plane of the cylinder head. The arrangement could, however, be such that the lines of action of one rocking lever lay in the axial transverse plane and only the line of action of the other rocking lever was inclined to the axial transverse plane. The rocking lever 4 for the inner valve acts by one end or by its action part 4a directly and centrally on the stem 1 of the inner valve. The rocking lever 5 for the outer valve works on the stem 2 of the outer valve by means of an intermediate piece 6. At the end co-operating with the intermediate piece the rocking lever of the outer valve is forked, the fork 5a of the rocking lever 5 for the outer valve overlapping the action part 4a of the rocking lever for the inner valve. The shell part of the intermediate piece has a reinforced lower horizontal edge 6b which is rotatably supported on a circular track of a counter-surface of the edge 6b. The circular track is formed by a connecting piece 7 which, as shown, is screwed on to the stem of the outer valve. The circular connecting piece 7 is prevented from rotation by means of a nut 8. The outer edge 7a has a collar-shaped circular extension, which embraces the edge 6b of the intermediate piece, see FIG. 1a. The embracement of the edge 6b is such that the intermediate piece 6 is held fast with play in both axial directions by the connecting piece 7. The connecting piece 7 is also formed as a stop or spring plate for the cylindrical return spring $R_1$ of the outer valve. The action places of the fork 5a with the connecting piece lie on a line parallel to the rocking lever shaft in such a manner that the resultant force is transmitted along the centre line of the outer valve $V_2$ i.e. along the common axis of the valves. The shell of the cup-shaped intermediate piece 6 is provided with axial slots 6c. A double-armed yoke 9 moves up and down in these slots, this yoke being formed as a spring plate for the return spring $R_2$ of the inner valve.

For opening the inner valve, the rocking lever 4 acts directly on the valve stem of the inner valve. The double-armed yoke 9, formed as valve plate for the hairpin springs, is keyed rigidly to the stem 1 of the inner valve $V_1$ by means of a two-part conical keying piece 10. The action part 4a of the rocking lever 4 is so constructed that in the construction of the valves provided in FIG. 1 it can dip far enough into the cup-shaped intermediate piece 6 to fully open the inner valve. The axial dimension of the inner valve stem is such that in the closed condition of both valves $V_1$ and $V_2$ its end face is substantially flush with the end face of the intermediate piece 6 as shown in FIG. 1.

FIG. 4 shows a construction of the device in which helically coiled springs $R_1'$ and $R_2'$ are provided as the return springs of both valves. The spring plate 9' for the inner valve, which is constructed as a yoke, is made in this case with four arms as shown. A fitting washer 12 is provided on the pressure side of the yoke arms. The rest of the device shown in FIG. 4 corresponds with that shown in FIG. 1.

FIGS. 5 and 6 show a construction of the rocking lever 5' for the outer valve in which the action part 5'a or the rocking lever 5' encircles the action part 4'a of the rocking lever 4' for the inner valve. The encircling action part 5'a has two action places 5'b, the line joining which is parallel to the rocking lever shaft 3. The action places of the part 5'a are cam-shaped in construction. The remaining construction of the device again corresponds to that shown in FIG. 1. Instead of the hairpin springs, however, the helically coiled springs shown in FIG. 4, with the alterations relating thereto, could also be used in this case.

On both sides of the pairs of rocking levers, the rocking lever shaft 3 can be supported by means of pedestals 11 fixed to the cylinder head.

FIGS. 7 and 8 show rocking levers 4" and 5" which are of the same form for both valves. The action place for the inner valve, as in the preceding constructions, acts centrally on the end of the valve stem 1. In contrast to the constructions so far described, the action place for the outer valve sets with a single action place centrally on the intermediate piece 6' which in its turn, as described with reference to FIG. 1, is centrally and rotatably connected to the stem of the outer valve. In this construction, the arrangement is such that a forked construction for the rocking lever 5" is not necessary. This simplified construction is obtained by the fact that the end of the rocking lever 4" for the inner valve passes laterally through a slot 6'c of the intermediate piece for the outer valve, and, for actuating the inner valve $V_1$, co-operates with the end of the valve stem 1. The central aperture 6a according to FIG. 1 in the bottom of the cup-shaped intermediate piece 6 for the end of the rocking lever 5" is eliminated in the construction according to FIGS. 7 and 8. The central bottom part of the intermediate piece 6' becomes the action place of the rocking lever 5" on the intermediate piece 6' for actuating the outer valve $V_2$. The connection of the edge 6b of the cup-shaped intermediate piece 6' with the stem 2 of the outer valve having the part 7a corresponds to the construction shown and described with reference to FIG. 1a.

The spring plate 9' for the return spring of the inner valve which corresponds to the yoke 9 of FIG. 1, consists according to FIGS. 7 and 8 of an annular disc 9a and arms 9b connected to the hub 9c. The arms 9b pass through the slots 6'c and 6"c. The spring plate is keyed rigidly to the stem 1 of the inner valve by means of a two-part conical anchoring piece 10. The arrangement of the return springs $R_1'$ and $R_2'$ corresponds to that shown in FIG. 4. Instead of cylinder springs for the return of the inner valves, hairpin springs as shown in FIGS. 1 and 2 could also be used.

FIGS. 9 and 10 show a construction having a camshaft 13 arranged above the valve-actuating levers. In this case, the cams 12 actuate follower levers 14 and 15, through the medium of devices for adjusting the valve clearance. These devices consist of the disk-shaped head of a screw 16 passing centrally through the follower lever and adapted to be locked, after the adjustment has been made, by means of the nut 17. The end parts of the follower levers 14 and 15 from the actuating place of the cams 12 to the action places with the valve stems are inclined to the lever shaft 18, while the part connected to the lever shaft and extending as far as the screw 16 is at right angles to the lever shaft 18, see FIG. 10. Both follower levers 14 and 15 are of the same shape and may be made of the same casting, pressing or forging and assembled in inverse positions in the axial direction. The action place of the follower lever 14 with the stem of the inner valve and the action place of the follower lever 15 with the intermediate piece for the stem of the outer valve are arranged centrally one above the other, as in the construction according to FIGS. 7 and 8. The spring plate 9" for the return spring $R_2'$ of the inner valve has a somewhat different construction from FIGS. 7 and 8. In this case, for connecting the annular disc 9a to the hub 9c, three arms are provided instead of only two. One arm 9b passes through the slot through which the follower lever 14 also passes. Two other arms 9b pass through slots 6"c, offset by 120°, of the intermediate piece 6", see FIG. 9a. Fixing of the spring plate 9" to the valve stem 1 of the inner valve and fixing of the intermediate piece 6" to the valve stem 2 of the outer valve, and the arrangement of the return springs $R_1'$ and $R_2'$ are carried out in the same way as described with reference to FIGS. 7 and 8.

What I claim is:

1. A valve control gear for an internal combustion engine having a cylinder head, cylinders in said cylinder head, inner and outer valves co-axially arranged in said cylinder head, a common lever shaft for such cylinders, levers for operating each of a pair of said inner and outer valves mounted on said common lever shaft, the axes of said levers actuating said co-axially arranged inner and outer valves lying in axial planes equally inclined to the axis of said common lever shaft and intersecting with each other on the common axis of the inner and outer valves, an intermediate element, means connecting the intermediate element to the outer valve of each pair of inner and outer valves, a return spring for the outer valve, one end of the outer valve return spring bearing against the connecting means, an abutment means, means securing the abutment means to the inner valve of each pair of inner and outer valves, a return spring means for the inner valve including a portion bearing against said abutment means, said intermediate element having openings therein for receiving the means securing the abutment means to the inner valve, an action part on each lever, the action part of the lever for the inner valve extending through one of the openings in the intermediate element for engaging directly the inner valve for actuation thereof and the action part of the lever for the outer valve engaging the intermediate element for actuating the outer valve through the intermediate element and the means connecting the intermediate element to the outer valve.

2. A valve control gear as claimed in claim 1 in which said abutment means is defined as a fork component rigidly secured to the inner valve and the action part of the lever for the inner valve extending through an opening in the top of the intermediate element.

3. A valve control gear as claimed in claim 2 in which the action part of the lever for the inner valve moves into said intermediate element at least by an amount corresponding to the magnitude of the maximum stroke of the inner valve.

4. A valve control gear as claimed in claim 1 in which each lever is of the same configuration.

5. A valve control gear claimed in claim 4 in which said levers are assembled in reverse positions relative to one another.

6. A valve control gear as claimed in claim 1 in which said means connecting the intermediate element to the outer valve comprises a circular track provided on said outer valve and a circular flange on the intermediate element positioned in said track whereby the outer valve may rotate freely with respect to the intermediate element.

7. A valve control gear as claimed in claim 1 in which the action part of the lever for the outer control valve laterally encircles the action part of the lever of the inner valve.

8. A valve control gear as claimed in claim 1 in which the action part of each lever is located centrally with respect to the inner and outer valves and with the action parts being arranged one above the other.

9. A valve control gear for an internal combustion engine having a cylinder head, cylinders in said cylinder head, inner and outer valves co-axially arranged in said cylinder head, a common lever shaft for such cylinders, levers for operating each of a pair of said inner and outer valves mounted on said common lever shaft, the axes of said levers actuating said co-axially arranged inner and outer valves lying in axial planes equally inclined to the axis of said common lever shaft and intersecting with each other on the common axis of the inner and outer valves, a cup-shaped intermediate element, means connecting the lower end of the intermediate element to the outer valve of each pair of inner and outer valves, a coil returning spring for the outer valve embracing the outer valve and having one end thereof bearing against the connecting means, an annular disk, arms on the annular disk securing the disk to the inner valve of each pair of inner and outer valves, the intermediate element having slots therein through which said arms pass, a coil return spring for the inner valve arranged co-axially of the spring of the outer valve with one end of the inner valve return spring bearing against said disk, an action part on each lever arranged one above the other, the action part of the lever of the inner valve extending through one of said slots in the intermediate element for directly engaging the inner valve for actuating said inner valve, and the action part of the lever of the outer valve directly engaging the end of the intermediate element for actuating the outer valve through the intermediate element and means connecting the intermediate element to the outer valve.

10. A valve control gear as claimed in claim 9 in which the action part of the lever of the inner valve projects laterally through one of the openings in the intermediate element.

11. A valve control gear as claimed in claim 9 including a cam shaft located above said levers, means on said cam shaft for actuating the levers, and the end portions of the levers viewed in a direction forward of the actuating location of the means lying in an axial plane inclined to the lever shaft.

References Cited in the file of this patent

UNITED STATES PATENTS

| | | |
|---|---|---|
| 1,484,640 | Getchell | Feb. 26, 1926 |
| 2,309,291 | Anderson et al. | Jan. 26, 1943 |
| 2,439,618 | Cloutier | Apr. 13, 1948 |
| 2,720,873 | Pick | Oct. 18, 1955 |
| 2,840,059 | Buchi | June 24, 1958 |

FOREIGN PATENTS

| | | |
|---|---|---|
| 416,496 | Great Britain | Sept. 17, 1934 |